United States Patent
Shartle et al.

(10) Patent No.: US 9,043,087 B2
(45) Date of Patent: May 26, 2015

(54) METHOD OF DETERMINING A STEERING ANGLE IN A MOTOR VEHICLE

(71) Applicant: Honda Motor Co., Ltd., Tokyo, Minato-Ku (JP)

(72) Inventors: Ryan Shartle, Dublin, OH (US); Nathaniel Ellis, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 138 days.

(21) Appl. No.: 13/845,524

(22) Filed: Mar. 18, 2013

(65) Prior Publication Data

US 2014/0129085 A1    May 8, 2014

Related U.S. Application Data

(62) Division of application No. 12/723,886, filed on Mar. 15, 2010, now Pat. No. 8,428,822.

(51) Int. Cl.
   *B62D 6/00* (2006.01)
   *B62D 15/02* (2006.01)

(52) U.S. Cl.
   CPC ............. *B62D 6/002* (2013.01); *B62D 15/0235* (2013.01); *B62D 15/0245* (2013.01)

(58) Field of Classification Search
   CPC ...... B62D 15/00; B62D 15/02; B62D 15/021; B62D 15/0215; B62D 15/0235; B62D 15/024; B62D 15/045; B62D 15/025; B62D 6/002
   USPC ...................................................... 701/41, 42
   See application file for complete search history.

(56) References Cited

U.S. PATENT DOCUMENTS

| | | |
|---|---|---|
| 6,050,359 A | 4/2000 | Mouri et al. |
| 6,354,396 B1 | 3/2002 | Horton et al. |
| 6,466,848 B2 | 10/2002 | Ozaki |
| 6,763,293 B2 | 7/2004 | Dilger |
| 6,891,283 B2 | 5/2005 | Fukumoto et al. |
| 6,895,357 B2 | 5/2005 | Lou et al. |
| 6,929,089 B2 | 8/2005 | Asada |
| 6,957,713 B2 | 10/2005 | Tomita |
| 7,076,352 B2 | 7/2006 | Kohno et al. |
| 7,146,287 B2 | 12/2006 | Kichise et al. |
| 7,149,615 B2 | 12/2006 | Ura |
| 7,155,327 B2 | 12/2006 | Hamamoto et al. |
| 7,188,702 B2 | 3/2007 | Takagi et al. |
| 7,295,907 B2 | 11/2007 | Lu et al. |
| 7,324,646 B1 | 1/2008 | Burstyn et al. |
| 7,325,646 B2 | 2/2008 | Asada |
| 7,349,781 B2 | 3/2008 | Tamaizumi |
| 7,555,402 B2 | 6/2009 | Barthomeuf et al. |
| 8,428,822 B2 | 4/2013 | Shartle et al. |
| 2004/0061500 A1 | 4/2004 | Lou et al. |
| 2006/0085113 A1 | 4/2006 | Tamaizumi et al. |

(Continued)

FOREIGN PATENT DOCUMENTS

EP    1925529    5/2008

*Primary Examiner* — Jerrah Edwards
(74) *Attorney, Agent, or Firm* — Plumsea Law Group, LLC

(57) ABSTRACT

A method for determining a steering angle of a steering shaft in a motor vehicle is disclosed. The method uses a rotation sensor associated with an electric motor of a power steering system to determine the relative steering angle of the steering column. The relative steering angle is measured relative to an initial position of the steering column during vehicle startup. The relative steering angle is reset each time the motor vehicle is turned on.

20 Claims, 6 Drawing Sheets

(56) References Cited

U.S. PATENT DOCUMENTS

| | | |
|---|---|---|
| 2006/0235591 A1 | 10/2006 | Tamaizumi |
| 2007/0012506 A1 | 1/2007 | Asada |
| 2008/0011539 A1 | 1/2008 | Riepold et al. |
| 2008/0119987 A1 | 5/2008 | Hestermeyer et al. |
| 2008/0140340 A1 | 6/2008 | Barthomeuf et al. |
| 2008/0201037 A1 | 8/2008 | Suyama et al. |
| 2009/0171533 A1 | 7/2009 | Kataoka |
| 2009/0173566 A1 | 7/2009 | Ogasawara |
| 2009/0240389 A1 | 9/2009 | Nomura et al. |
| 2010/0235052 A1 | 9/2010 | Shartle et al. |

US 9,043,087 B2

METHOD OF DETERMINING A STEERING ANGLE IN A MOTOR VEHICLE

CROSS-REFERENCE TO RELATED APPLICATION

This application is a division of U.S. Pat. No. 8,428,822, currently U.S. application Ser. No. 12/723,886, entitled "Method of Determining a Steering Angle in a Motor Vehicle," filed on Mar. 15, 2010, and allowed on Dec. 27, 2012, which application is incorporated herein by reference in its entirety.

BACKGROUND

The present invention relates generally to a motor vehicle, and in particular to a method for determining a steering angle in a motor vehicle.

Some systems of a motor vehicle may require the use of a steering angle for proper operation. For example, vehicle stability assist systems have been proposed that use steering angle and other operating parameters of a motor vehicle to determine if the motor vehicle is skidding.

Methods of determining a steering angle in a motor vehicle have been previously proposed. However, the related art utilizes methods that sense the absolute angular position of a steering shaft, usually relative to a center or midpoint position of the steering shaft. In particular, these methods make use of stored values or known absolute reference positions for determining steering angle relative to the midpoint position of the steering shaft. Therefore, there exists a need in the art for a method that addresses the shortcomings of the related art.

SUMMARY

In one aspect, the invention provides a method of operating a motor vehicle, comprising: setting a relative steering angle equal to an initial value while a steering shaft is in a first angular position immediately following a first ignition on event; determining an amount of steering angle rotation of the steering shaft; determining a new value for the relative steering angle according to the amount of steering angle rotation; resetting the relative steering angle to the initial value while the steering shaft is in a second angular position immediately following a second ignition on event, the second ignition on event occurring later than the first ignition event; and wherein the first angular position is different than the second angular position.

In another aspect, the invention provides a method of operating a motor vehicle, comprising: setting a relative steering angle equal to an initial value while a steering shaft is in an initial angular position immediately following an ignition on event; receiving information from a rotation sensor, the rotation sensor being configured to determine an amount of motor angle rotation of a motor that is configured to facilitate turning the motor vehicle; determining an amount of steering angle rotation of the steering shaft of the motor vehicle according to the amount of motor angle rotation; adding the amount of steering angle rotation to the relative steering angle to determine a new relative steering angle; continuing to update the value of the relative steering angle value according to information received from the rotation sensor; and wherein the initial value is independent of the initial angular position of the steering shaft.

In another aspect, the invention provides a method of operating a motor vehicle, comprising: determining a relative steering angle, the relative steering angle differing from an actual steering angle by a steering angle offset and wherein the value of the steering angle offset varies according to an initial angular position of a steering shaft at the time of starting the motor vehicle; determining if the motor vehicle is operating in a stable driving mode or an unstable driving mode; performing a step of determining the steering angle offset when the motor vehicle is operating in the stable driving mode; and calculating an adjusted steering angle using the relative steering angle and the steering angle offset.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
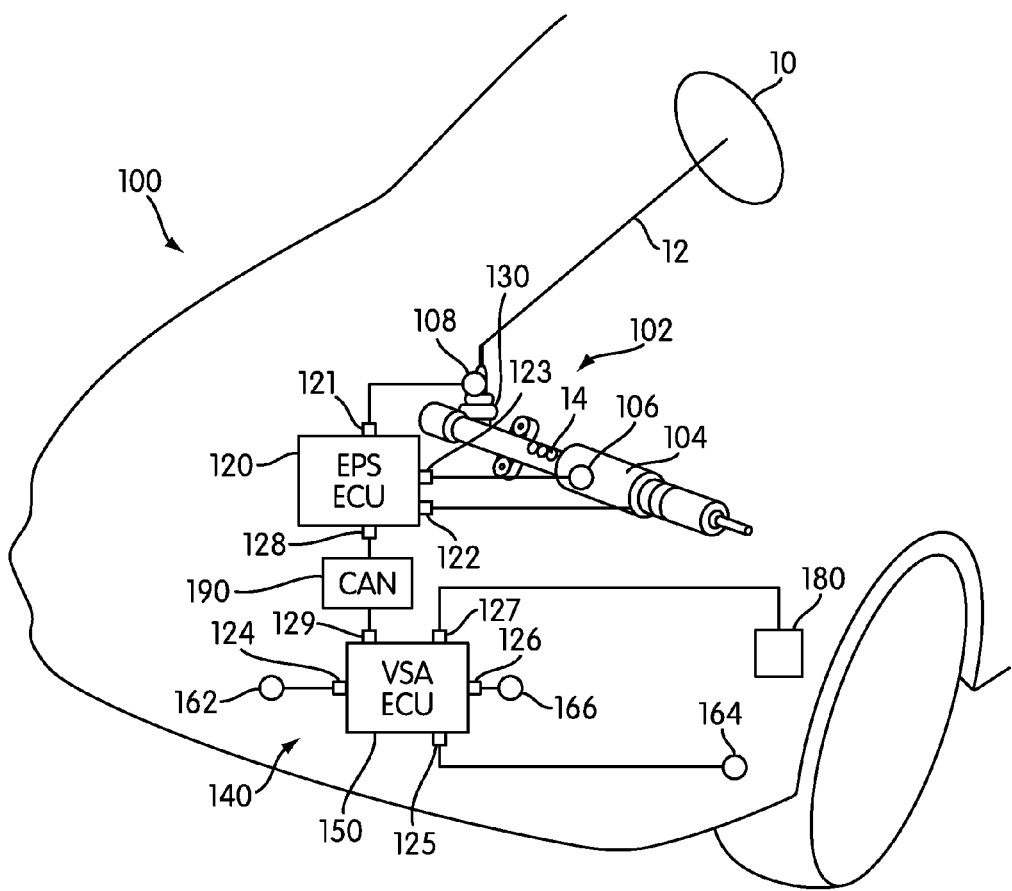
FIG. 1 is a schematic view of an embodiment of a motor vehicle including a power steering system and a vehicle stability assist system.

FIG. 1 is a schematic view of an embodiment of motor vehicle 100. The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

For purposes of illustration, some components of motor vehicle 100 are shown schematically in this embodiment. In one embodiment, motor vehicle 100 can include steering wheel 10 that is further connected to steering shaft 12. Steering shaft 12 can be connected to rack 14, which may be further connected to the front wheels of motor vehicle 100 using tie rods.

Motor vehicle 100 can include power steering system 102. Power steering system 102 can be any system designed to reduce the steering effort used by a driver to turn or steer a motor vehicle. In some cases, power steering system 102 may be a hydraulic type power steering system. In other cases, power steering system 102 may be an electric power steering system. In an exemplary embodiment, power steering system 102 may be an electric power steering system that uses an electric motor to provide assistance in turning or steering a motor vehicle. Examples of different types of power steering systems can be found in U.S. Pat. No. 7,188,702, to Takagi and U.S. Pat. No. 7,155,327, to Hamamoto et al., both of which are hereby incorporated by reference.

Power steering system 102 may include provisions for assisting a driver in turning a motor vehicle. In one embodiment, power steering system 102 can include motor 104. Generally, motor 104 can be any type of motor. In an exemplary embodiment, motor 104 can be an electric motor that is configured to drive one or more components of a motor vehicle to assist in turning the motor vehicle. For example, in a rack-and-pinion type steering system, motor 104 may be installed concentrically around the rack to provide assistance in pushing the rack to the left or to the right. In other embodiments using different types of steering systems, motor 104 can be provided in various locations to provide assistance in turning the motor vehicle.

Power steering system 102 can include provisions for monitoring the rotation of steering shaft 12. In some cases, power steering system 102 can include a position sensor that is configured to monitor the absolute position of steering shaft 12. In other cases, power steering system 102 can include a rotation sensor of some kind that is configured to directly monitor the rotation of steering shaft 12. In embodiments using an electric motor to help assist with turning, power steering system 102 can include a sensor configured to measure the angular rotation of the motor. Since the rotation of a motor in a power steering system is typically related to the rotation of a steering shaft by a fixed gear ratio, a measurement of the rotation of the motor can be related directly to a measurement of the rotation of the steering shaft.

In some embodiments, power steering system 102 can include rotation sensor 106. Generally, rotation sensor 106 can be any type of sensor configured to detect the rotation of motor 104. For example, in one embodiment, a plurality of hall sensors can be associated with motor 104 to measure movements of a rotor. In an exemplary embodiment, a resolver type sensor can be used for detecting the rotations of a rotor within motor 104. In still other embodiments, other types of sensors can be used for detecting the rotation of motor 104.

Power steering system 102 can also include provisions for detecting torque applied by a driver to a steering system. In one embodiment, power steering system 102 can include steering torque sensor 108. In some cases, steering torque sensor 108 can be associated with a gearbox of the steering system. In other cases, however, steering torque sensor 108 can be provided at any other location of a steering system. Using this arrangement, a power steering system can determine the amount of steering assistance that may be required.

Motor vehicle 100 may include provisions for communicating, and in some cases controlling, the various components associated with power steering system 102. In some embodiments, motor vehicle 100 may be associated with a computer or similar device. In the current embodiment, motor vehicle 100 may be associated with a power steering system electronic control unit, hereby referred to as first ECU 120. In one embodiment, first ECU 120 may be configured to communicate with, and/or control, motor 104, rotation sensor 106 and steering torque sensor 108 as well as other components or systems.

First ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with first ECU 120 are optional. Some embodiments may include a given port or provision, while others may exclude it. The following description discloses many of the possible ports and provisions that can be used, however, it should be kept in mind that not every port or provision must be used or included in a given embodiment.

In one embodiment, first ECU 120 can include first port 121 for communicating with steering torque sensor 108, second port 122 for communicating with motor 104 and third port 123 for communicating with rotation sensor 106. In particular, using first portion 121, first ECU 120 can receive information from steering torque sensor 108 related to the torque applied to steering shaft 12. With this information, first ECU 120 can determine how much steering assistance is required and send a control signal to motor 104, using second port 122 to operate motor 104 in a manner that provides the required steering assistance. In addition, first ECU 120 may receive information from rotation sensor 106 via third port 123 about the rotation of motor 104, which may be used to further determine the rotation of steering shaft 12.

Motor vehicle 100 can include provisions for providing increased stability assistance during driving. In an exemplary embodiment, motor vehicle 100 can include vehicle stability assist system 140. Vehicle stability assist system 140 can be any electric stability control system that is capable of modifying the operation of a vehicle by detecting and preventing undesirable motions such as skidding. In particular, vehicle stability assist system 140 may be configured to detect loss of steering control and provide individual braking at different wheels to help redirect a vehicle.

Vehicle stability assist system 140 can be associated with one or more sensors configured to receive information related to operating conditions of motor vehicle 100. In some embodiments, motor vehicle 100 can include acceleration sensor 162. Generally, acceleration sensor 162 can be any type of acceleration sensor. In one embodiment, acceleration sensor 162 can be a gyroscopic sensor configured to receive information related to a yaw rate of a vehicle and/or lateral G force information. Although a single sensor may be used in the current embodiment for detecting yaw rate and lateral G force information, in other embodiments more than one sensor can be used with a motor vehicle.

In one embodiment, motor vehicle 100 can include set of wheel speed sensors 164. In some cases, set of wheel speed sensors 164 may comprise a set of four independent wheel speed sensors associated with the four wheels of motor vehicle 100. In particular, each wheel speed sensor of set of wheel speed sensors 164 may be configured to detect the speed of a corresponding wheel of motor vehicle 100. Using this information, vehicle stability assist system 140 may detect variations in wheel speed over each of the four wheels of motor vehicle 100 for detecting slipping, skidding, or other undesirable vehicle motions. Furthermore, while four wheel speed sensors may be used in an exemplary embodiment, other embodiments can include any other number of wheel speed sensors. In an alternative embodiment including a vehicle with more than four wheels, for example, more than four wheel speed sensors may be provided on the motor vehicle.

In some embodiments, motor vehicle 100 can include vehicle speed sensor 166. In some cases, vehicle speed sensor 166 can be a vehicle speed pulse sensor associated with a transmission of motor vehicle 100. In other cases, vehicle speed sensor 166 can be any other type of sensor configured to provide vehicle speed information to one or more systems of motor vehicle 100. By monitoring information received from vehicle speed sensor 166, vehicle stability assist system 140 may be configured to detect unwanted operating conditions in a motor vehicle.

Motor vehicle 100 may include provisions for communicating, and in some cases controlling, the various components associated with vehicle steering assist system 140. In some embodiments, motor vehicle 100 may be associated with a computer or similar device. In the current embodiment, motor vehicle 100 may be associated with a vehicle stability assist system electronic control unit, hereby referred to as second ECU 150. In one embodiment, second ECU 150 may be configured to communicate with, and/or control various sensors and systems of motor vehicle 100 that are utilized in operating vehicle stability assist system 140.

Second ECU 150 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

In one embodiment, second ECU 150 can include fourth port 124 for communicating with acceleration sensor 162. In particular, second ECU 150 can be configured to receive information related to a yaw rate of motor vehicle 100 from acceleration sensor 162. In addition, second ECU 150 may be configured to receive lateral G information related to motor vehicle 100 from acceleration sensor 162. Also, second ECU 150 can include fifth port 125 for communicating with set of wheel speed sensors 164. In particular, second ECU 150 can be configured to receive information about the speeds of one or more wheels of motor vehicle 100. Also, second ECU 150 can include sixth port 126 for communicating with vehicle speed sensor 166. In particular, second ECU 150 can be configured to receive vehicle speed pulse information associated with a transmission of motor vehicle 100. With this arrangement, second ECU 150 may be configured to determine various operating conditions of motor vehicle 100 to determine if motor vehicle 100 is skidding or sliding.

Vehicle stability assist system 140 can also include provisions for controlling one or more systems of a motor vehicle in order to provide stability control. In some embodiments, second ECU 150 can include seventh port 127 for communicating with braking system 180. For example, in some cases, upon detecting a skidding condition of a motor vehicle, second ECU 150 may send control signals to breaking system 180 to apply individual breaking to the wheels of motor vehicle 100 in order to stabilize the driving conditions and reduce skidding. In other embodiments, vehicle stability assist system 140 can be associated with additional systems of a motor vehicle for assisting in controlling a motor vehicle during skidding or other undesired operating conditions. For example, in another embodiment, second ECU 150 could be configured to control an engine in a manner that reduces power during situations where steering control is lost.

Motor vehicle 100 can include provisions for providing communication between various systems. In one embodiment, motor vehicle 100 can include provisions for providing communication between power steering system 102 and vehicle stability assist system 140. In some cases, motor vehicle 100 can include vehicle controller area network 190. In some cases, vehicle controller area network 190 may provide communication between any systems of a motor vehicle utilizing some type of electronic control unit. In an exemplary embodiment, vehicle controller area network 190 is configured to provide communication between power steering system 102 and vehicle stability assist system 140. In particular, first ECU 120 of power steering system 102 may communicate with vehicle controller area network 190 using eighth port 128, while second ECU 150 of vehicle stability assist system 140 may communicate with vehicle controller area network 190 using ninth port 129.

A motor vehicle may include provisions for determining the steering angle for use in one or more subsystems. For example, a vehicle stability assist system may require a steering angle for purposes of comparing the actual vehicle motion (as measured by various sensors) with the intended motion of the driver (as measured by steering angle).

Figure 2:
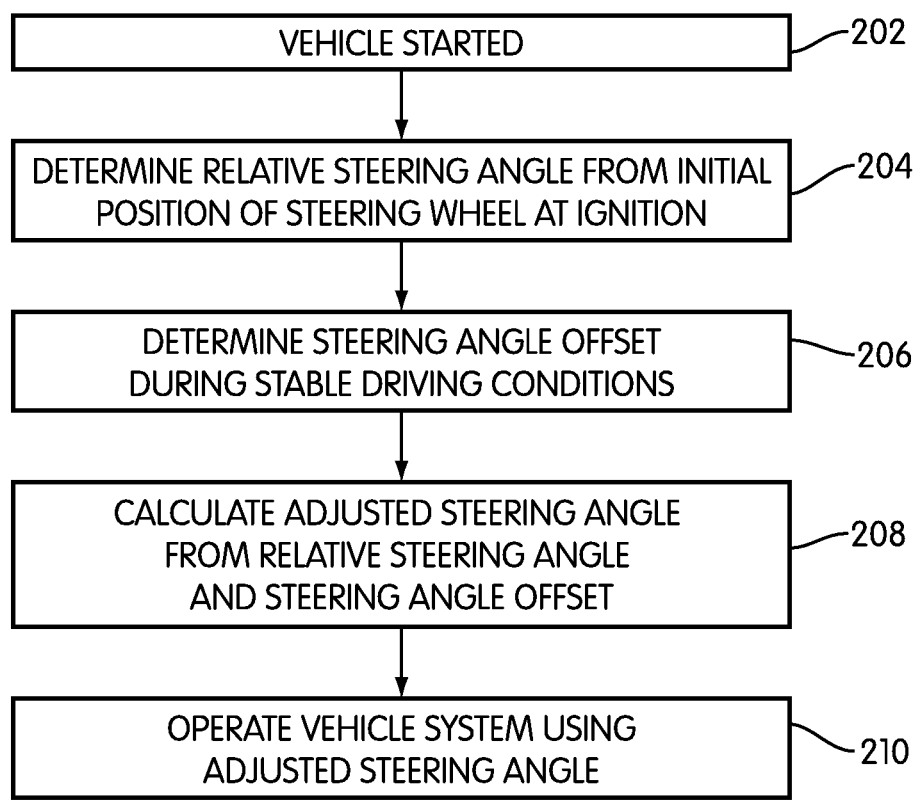
FIG. 2 is an embodiment of a process for determining an adjusted steering angle according to a relative steering angle.

FIG. 2 illustrates an embodiment of a process for determining a steering angle of a steering system. In this embodiment, the following steps may be performed by various subsystems of a motor vehicle. For example, in some cases, the following steps could be performed by first ECU 120 and/or second ECU 150 of power steering system 102 and vehicle stability assist system 140, respectively. However, in some other embodiments these steps may be performed by additional systems or devices associated with motor vehicle 100. In addition, it will be understood that in other embodiments one or more of the following steps may be optional.

During step 202, a motor vehicle may be turned on. In particular, the ignition may be turned to start up the engine as well as various other subsystems of the motor vehicle. Although the current embodiment includes a method of determining a steering angle when an engine of a motor vehicle is activated, in other embodiments, the method may begin anytime one or more subsystems of a motor vehicle are powered on. For example, many vehicles include an intermediate starting position that powers on various electronic systems without starting the engine of the motor vehicle. In one alternative embodiment, the following process may start when the ignition is turned to the intermediate starting position.

During step 204, a relative steering angle of a steering system may be determined. The term "relative steering angle" as used throughout this detailed description and in the figures, refers to an angle that is measured from a location corresponding to the initial position of the steering system at the time of starting the vehicle. For example, if the steering wheel is rotated from the straight on position (or midpoint position) by thirty degrees at the time of ignition, the relative steering angle is an angle measured with respect to that initial position, rather than an angle measured with respect to the midpoint of the steering shaft or some other absolute position. Details for a method of measuring the relative steering angle are discussed below.

Following step 204, during step 206, a steering angle offset value may be determined during stable driving conditions. During this step, a system of the motor vehicle, such as the vehicle stability assist system, may attempt to calibrate the relative steering angle determined during step 204. In particular, the purpose of the calibration is to achieve a steering angle that is approximately equal to the actual steering angle, which is the current angular position of the steering shaft as measured from a midpoint position of the steering shaft. Here, the term "midpoint position" refers to the position of the steering shaft where the motor vehicle moves approximately straight. In other words, this process allows for the determination of a steering angle offset that is the difference between the relative steering angle and the actual steering angle.

In an exemplary embodiment, in order to reduce errors in the steering angle offset calibration process, step 206 may only be performed during stable driving conditions. Generally, stable driving conditions can be determined using any vehicle operating information. In some cases, information related to yaw rate, lateral G information, wheel speeds, vehicle speed, as well as other information can be used to determine if a vehicle is operating in a stable condition. In particular, stable driving conditions may be associated with straight line driving in some cases, since undesired motions such as skidding are less likely to occur during straight line driving.

Following step 206, during step 208, an adjusted steering angle can be calculated from the relative steering angle and the steering angle offset. In particular, after determining the steering angle offset during stable driving conditions, the adjusted steering angle can be calculated by adding the steering angle offset to the relative steering angle. If, prior to step 208, the steering angle offset has not been determined because the driving conditions are not stable, the adjusted steering angle may be approximately equal to the relative steering angle until the steering angle offset learning can be performed.

In different embodiments, the step of determining the steering angle offset can be performed at different times. In some cases, the steering angle offset can be determined during a single calibration process after the motor vehicle has been started and during a period when the motor vehicle is in a stable driving mode. In other cases, the steering angle offset can be determined during multiple calibration processes that occur each time the motor vehicle is in a stable driving mode. In the exemplary embodiment, the steering angle offset can be determined once after the motor vehicle has been started and stored while the motor vehicle remains on. Furthermore, in the exemplary embodiment, after the motor vehicle is turned off, the value of the steering angle offset is erased and a new calibration procedure must be performed when the motor vehicle is restarted.

Next, during step 210, the adjusted steering angle can be used by one or more vehicle systems. For example, the vehicle stability assist system discussed above may use the adjusted steering angle and other sensor information to determine if the motor vehicle is skidding or otherwise in need of stability assistance. If stability assist is required, the system can apply individual braking to help regain steering control for the driver.

Figure 3:
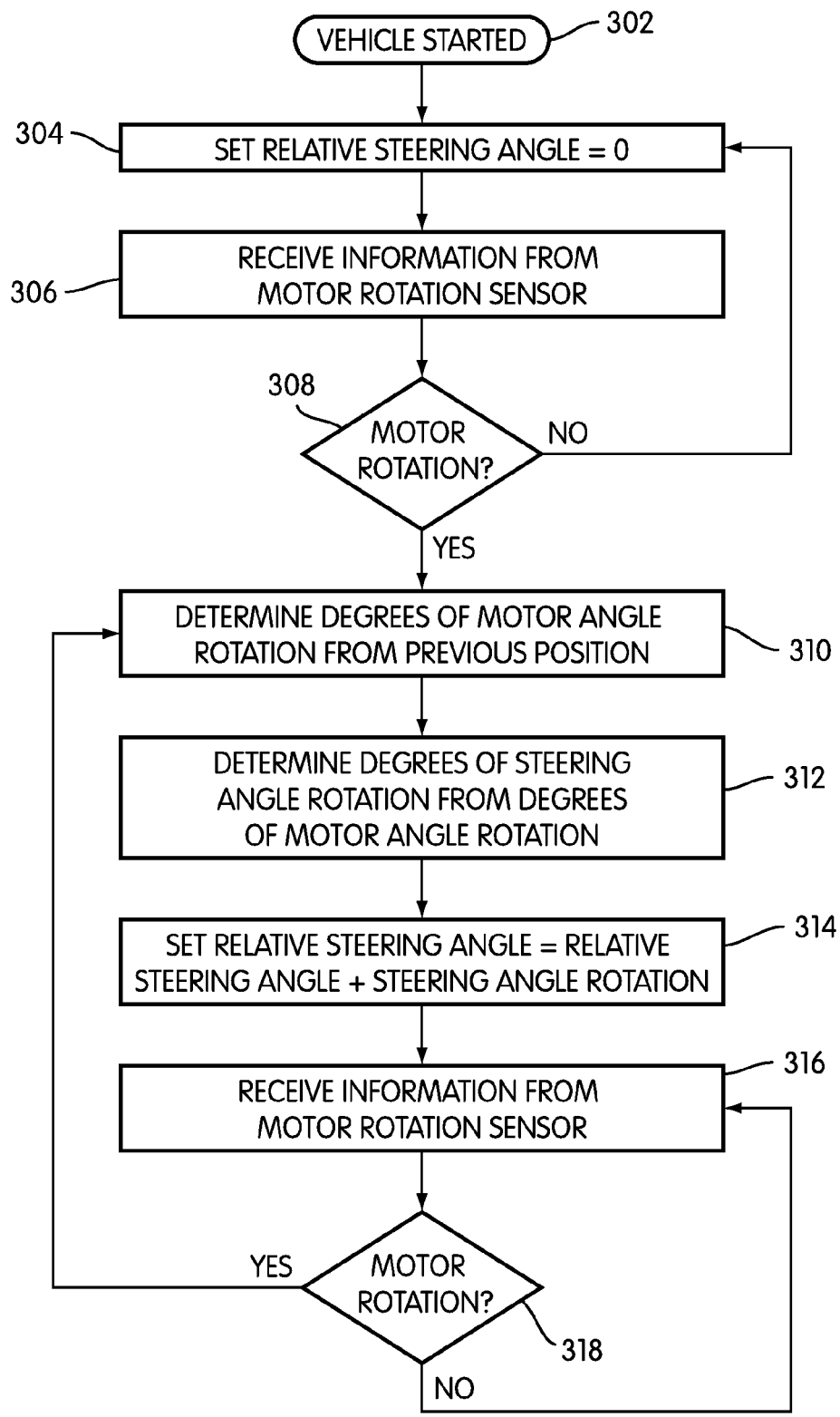
FIG. 3 is an embodiment of a process for determining a relative steering angle for a steering shaft using a rotation sensor.

FIG. 3 illustrates an embodiment of a process for determining a relative steering angle of a steering system. In this embodiment, the following steps may be performed by various subsystems of a motor vehicle. For example, in some cases, the following steps could be performed by first ECU 120 of power steering system 102; however in some other embodiments these steps may be performed by additional systems or devices associated with motor vehicle 100. In addition, it will be understood that in other embodiments one or more of the following steps may be optional.

During step 302, a motor vehicle may be started. Following this, during step 304, first ECU 120 may set the relative steering angle to 0 degrees. In other words, first ECU 120 associates 0 degrees with the initial position of the motor at startup. Next, during step 306, first ECU 120 may receive information from a rotation sensor associated with a motor of a power steering system. Following this, during step 308, first ECU 120 may determine if the motor has rotated according to information received from the rotation sensor. If, during step 308, no rotation has occurred, first ECU 120 may return to step 304. If, however, during step 308, first ECU 120 determines that the motor has rotated, first ECU 120 may proceed to step 310.

During step 310, first ECU 120 determines the amount of motor angle rotation from the previous position. In some cases, first ECU 120 may determine how many degrees the motor has rotated from the previous position. In other cases, first ECU 120 may measure the amount of rotation using another measurement unit, such as radians. It will be understood that first ECU 120 could determine both positive and negative rotations of the motor. For example, in one embodiment, if the motor has moved clockwise from the previous position by n degrees, then first ECU 120 may determine that the motor has undergone a rotation of positive n degrees. However, if the motor has moved counterclockwise from the previous position by n degrees, then first ECU 120 may determine that the motor has undergone a rotation of negative n degrees.

Following step 310, during step 312, first ECU 120 may determine the amount of steering angle rotation from the previous position. In embodiments where rotations are measured in degrees, first ECU 120 may determine how many degrees the steering shaft has rotated from the previous position. In some cases where the motion of the motor is related to the motion of the steering shaft by some gear ratio, first ECU 120 may multiply the number of degrees the motor has rotated by the fixed gear ratio to get the number of degrees the steering shaft has rotated. In other embodiments, however, other methods can be used to determine the amount of rotation of the steering shaft using the amount of rotation of the motor.

Next, first ECU 120 may proceed to step 314. During step 314, first ECU 120 may add the steering angle rotation determined during step 312 to the relative steering angle to calculate a new value for the relative steering angle. In other words, the relative steering angle may be updated to include the most recent change in the rotation of the steering shaft.

Following step 314, during step 316, first ECU 120 may receive information again from the rotation sensor. Following this, during step 318, first ECU 120 may determine if the motor has rotated according to information received from the rotation sensor. If, during step 318, no rotation as occurred, first ECU 120 may return to step 316. If, however, during step 318, first ECU 120 determines that the motor has rotated, first ECU 120 may proceed to step 310. At this point, first ECU 120 proceeds again through step 310, step 312 and step 314 to update the value of the relative steering angle according to the recent change in the angular position of the steering shaft. With this arrangement, the relative steering angle can be continuously updated as a driver turns a steering wheel in various directions while driving the motor vehicle.

Generally, this process may continue as long as the motor vehicle stays on. In particular, once the vehicle ignition is turned off, any stored values, including the relative steering angle, are replaced when the vehicle is restarted. Furthermore, when the ignition is switched on again, the relative steering angle is reset at 0 to correspond to the new initial position of the motor at startup.

For purposes of clarity, the above discussion uses an initial relative steering angle of 0 degrees that corresponds to the angular position of the motor at vehicle startup. However, it will be understood that in other embodiments, any value can be used for the initial relative steering angle. In particular, only the changes in the relative steering angle over time are necessary to determine an adjusted steering angle using the method discussed above. Furthermore, in other embodiments, the amount of rotation of either the motor or the steering shaft can be measured using radians or any other kind of unit that may be used for measuring angles.

In different embodiments, the range of the relative steering angle can vary. In one embodiment, the relative steering angle can have any value in the range between negative 1512 degrees and positive 1512 degrees. In particular, while a rotation sensor may be configured to determine 360 degree motion of a motor, an ECU can be configured to store rotations of more than 360 degrees from the initial position of the motor. In addition, the resolution of the relative steering angle can vary in different embodiments. In some cases, the relative steering angle may have a resolution of 1 degree. In other cases, the relative steering angle may have a resolution less than 1 degree. In an exemplary embodiment, the relative steering angle may have a resolution of approximately 0.1 degrees.

Figure 4:
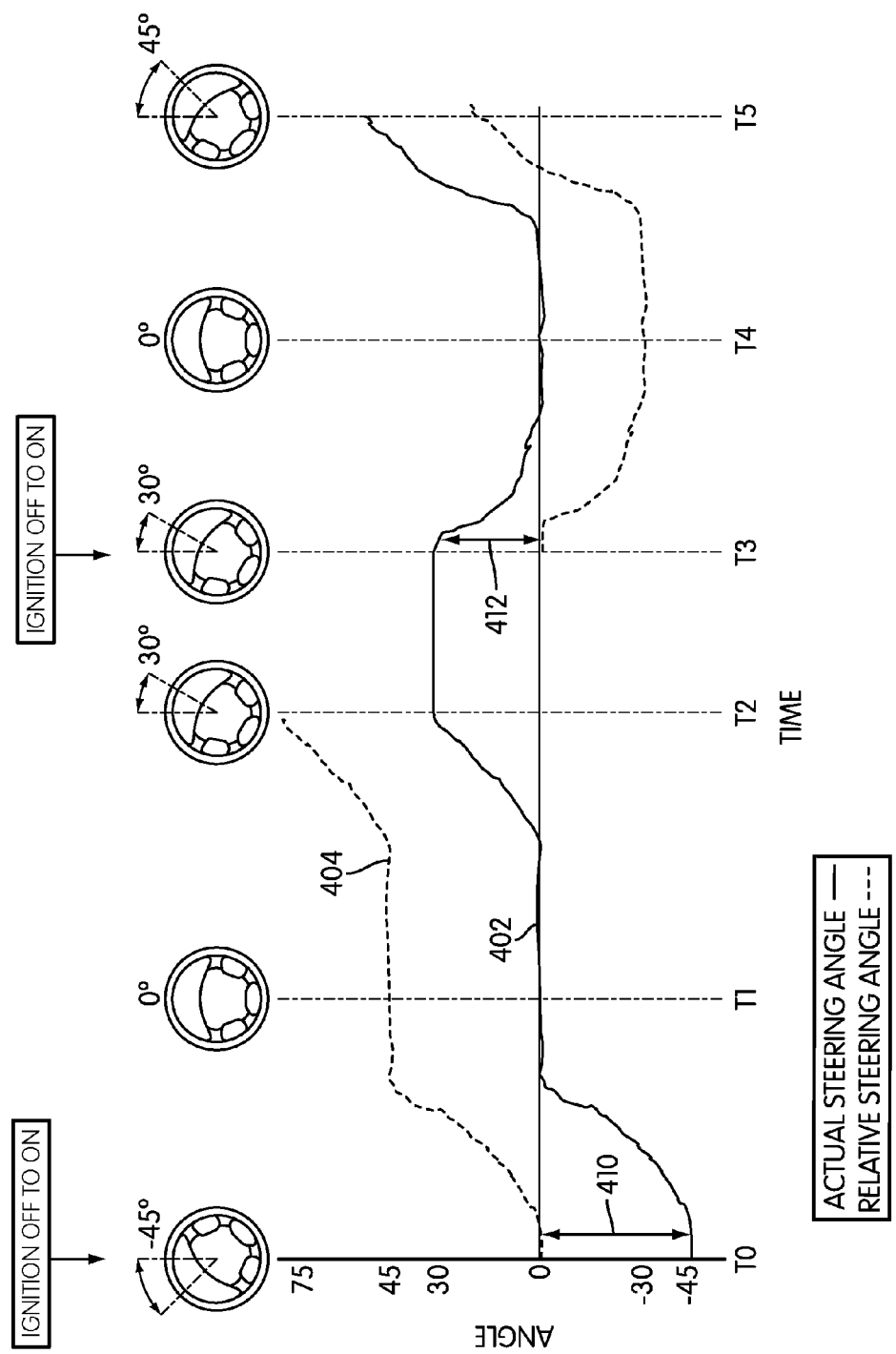
FIG. 4 is a schematic view of an embodiment illustrating the relationship of an actual steering position and a relative steering position over time.

FIG. 4 illustrates an embodiment of actual steering angle and relative steering angle over time. Referring to FIG. 4, at time T0, a first ignition on event may occur. The term "ignition on event" refers to the initial moment at which the motor vehicle is started. In other words, the ignition of a motor vehicle may be switched to an on position. Also, at time T0, the steering wheel is disposed on an initial position of −45 degrees. In other words, the steering wheel has been rotated counterclockwise by 45 degrees as measured from the center steering position or midpoint of the steering shaft. The angular position of the steering wheel is indicated by actual steering angle 402, which has a value of −45 degrees at time T0. In contrast to actual steering angle 402, at time T0 relative steering angle 404 has a value of 0 degrees. As discussed above, the relative steering angle is reset to 0 when a vehicle is started, with the 0 degree position corresponding to the current position of the steering shaft at startup.

In this embodiment, at time T0, the difference between actual steering angle 402 and relative steering angle 404 (specifically, the value of actual steering angle 402 minus the value of relative steering angle 404 at time T0) is indicated as first steering angle offset 410. In this case, first steering angle offset 410 has a value of approximately −45 degrees. Furthermore, first steering angle offset 410 may remain constant as long as the motor vehicle stays on, which corresponds to the period between time T0 and time T2 in this embodiment.

After some time passes, at time T1, actual steering angle 402 has a value of 0 degrees, which corresponds to a straight ahead position. This may occur as a driver turns the wheel back to the center position soon after starting the vehicle to begin straight-line driving on a roadway. In contrast, relative steering angle 404 at time T1 has a value of 45 degrees, which corresponds to the previously discussed offset between the actual steering angle and the relative steering angle. Furthermore, at a later time T2, the steering wheel has been rotated to a position of positive 30 degrees from the midpoint or center position so that actual steering angle 402 has a value of 30 degrees. Also, at time T2, relative steering angle 404 has a value of 75 degrees.

In this embodiment, at time T2, the vehicle ignition is turned to the off position. Between time T2 and T3, actual steering angle 402 remains at 30 degrees because the steering wheel remains in this position while the vehicle is turned off. However, since the motor vehicle is powered off between time T2 and time T3, relative steering angle 404 has no value in this period of time because the relative steering angle is stored in volatile memory. In other words, the value of relative steering angle 404 is lost once the vehicle is turned off and cannot be retrieved when the motor vehicle is restarted.

At time T3, the motor vehicle is restarted during a second ignition on event. At this point, the value of actual steering angle 402 remains at 30 degrees. However, the value of relative steering angle 404 is reset to 0 as the vehicle is started again. In this case, the difference between actual steering value 402 and relative steering angle 404 is indicated by second steering angle offset 412. In this case, second steering angle offset 412 has a value of approximately 30 degrees. In particular, actual steering angle 402 is equal to relative steering angle 404 plus 30 degrees. This offset value between actual steering angle 402 and relative steering angle 404 of 30 degrees may be maintained as long as the vehicle stays powered on.

Following time T3, at time T4, actual steering angle 402 has a value of approximately 0, corresponding to the rotation of the steering wheel back to the straight ahead position. Also at time T4, relative steering angle 404 has a value of −30 degrees. Furthermore, at a later time T5, actual steering angle 402 has a value of approximately 45 degrees, while relative steering angle 404 has a value of approximately 15 degrees, corresponding to the offset of 30 degrees between actual steering angle 402 and relative steering angle 404.

Figure 5:
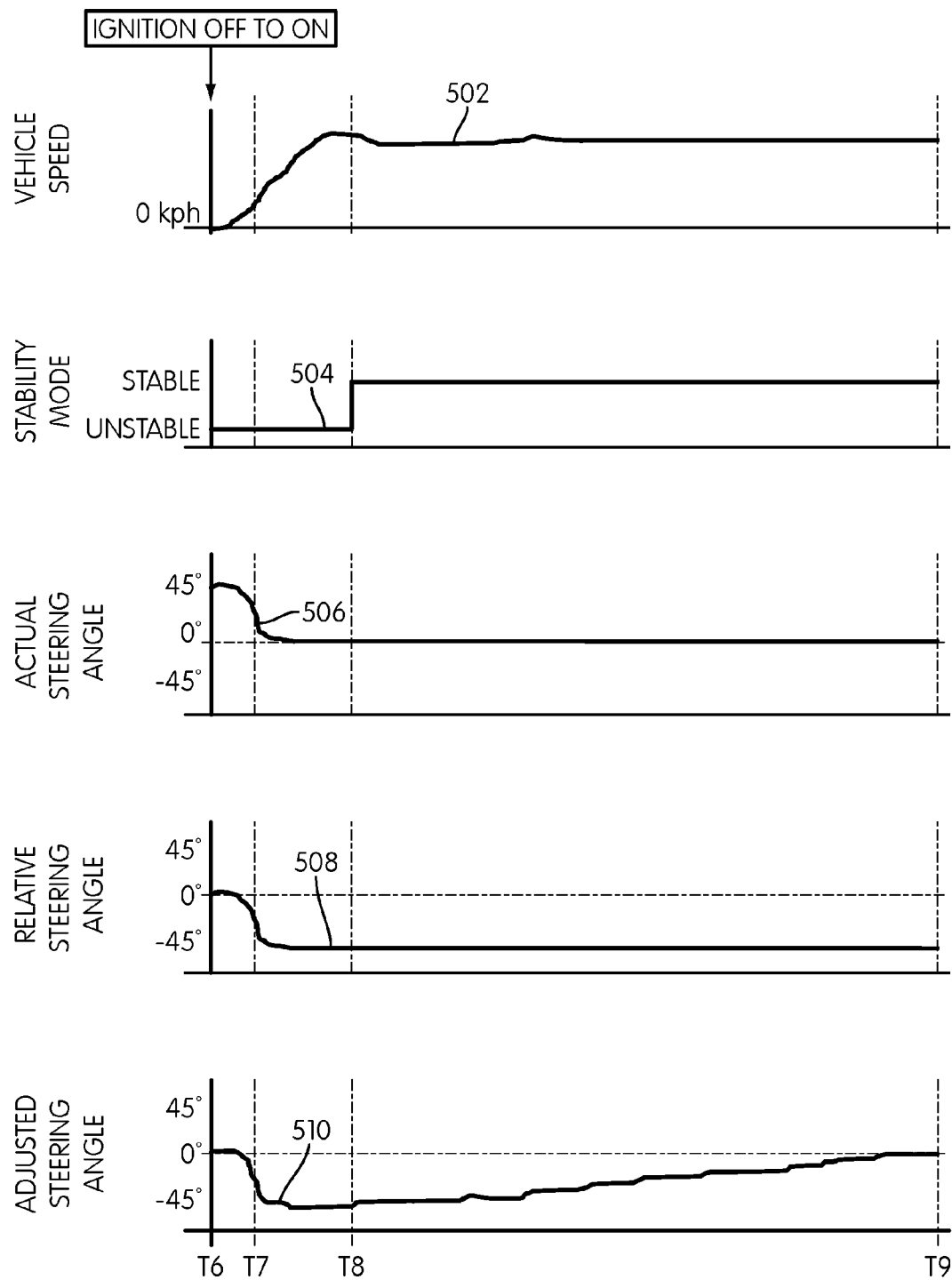
FIG. 5 is a schematic view of an embodiment illustrating the relationship of various vehicle operating parameters over time.

FIG. 5 illustrates the relationships of various parameters associated with a steering angle of a motor vehicle over time. Referring to FIG. 5, at time T6, the motor vehicle may be started. At this point, vehicle speed 502 may be 0. In addition, the steering shaft may be rotated by 45 degrees as indicated by actual steering angle 506. Relative steering angle 508 in the current embodiment is set to 0 when the vehicle is started. In other words, the offset between relative steering angle 508 and actual steering angle 506 is approximately 45 degrees. Also, initially, the value of adjusted steering angle 510 corresponds to the value of relative steering angle 508 since no steering angle offset learning has occurred yet.

Immediately following time T6, vehicle speed 502 begins to increase. At time T7, the steering wheel is rotated to the straight ahead position resulting in a value of 0 degrees for actual steering angle 506. In a similar manner, the values of relative steering angle 508 and adjusted steering angle 510 also change from 0 degrees to −45 degrees.

During the time between time T6 and time T8, the motor vehicle is judged to be driving in an unstable driving mode as indicated by stability mode 504. At time T8, however, the motor vehicle begins operating in a stable driving mode. At this point, the calibration process for determining the steering angle offset begins, as indicated by changes in adjusted steering angle 510. In particular, after time T8, adjusted steering angle 510 begins to change while both actual steering angle 506 and relative steering angle 508 remains substantially constant. Eventually, at time T9, the value of adjusted steering angle 510 is approximately equal to the value actual steering angle 506. In particular, the value of both adjusted steering angle 510 and actual steering angle 506 at time T9 is approximately 0 degrees.

Between time T8 and time T9, while the motor vehicle is in a stable driving mode, the system may attempt to calibrate adjusted steering angle 510 using an iterative or adaptive process. In particular, during this time, the system may iteratively increase the adjusted steering angle until the adjusted steering angle is approximately equal to actual steering angle 506. Furthermore, during this time, the system may estimate the steering angle offset, which is added to the relative steering angle to calculate the adjusted steering angle. During this time, the steering angle offset is also increased until the value of the steering angle offset is approximately equal to the value of the actual steering angle minus the relative steering angle.

In different embodiments, the process of determining the steering angle offset can vary. In some embodiments, this calibration process can be performed using a value of the steering angle that is calculated using a vehicle model. In some cases, this process can comprise determining a calculated steering angle from a model according to various inputs including information related to yaw rate, wheel speeds, vehicle speed pulse, lateral G information as well as other types of vehicle operating information. In other embodiments, other processes for determining the steering angle offset can be used.

Figure 6:
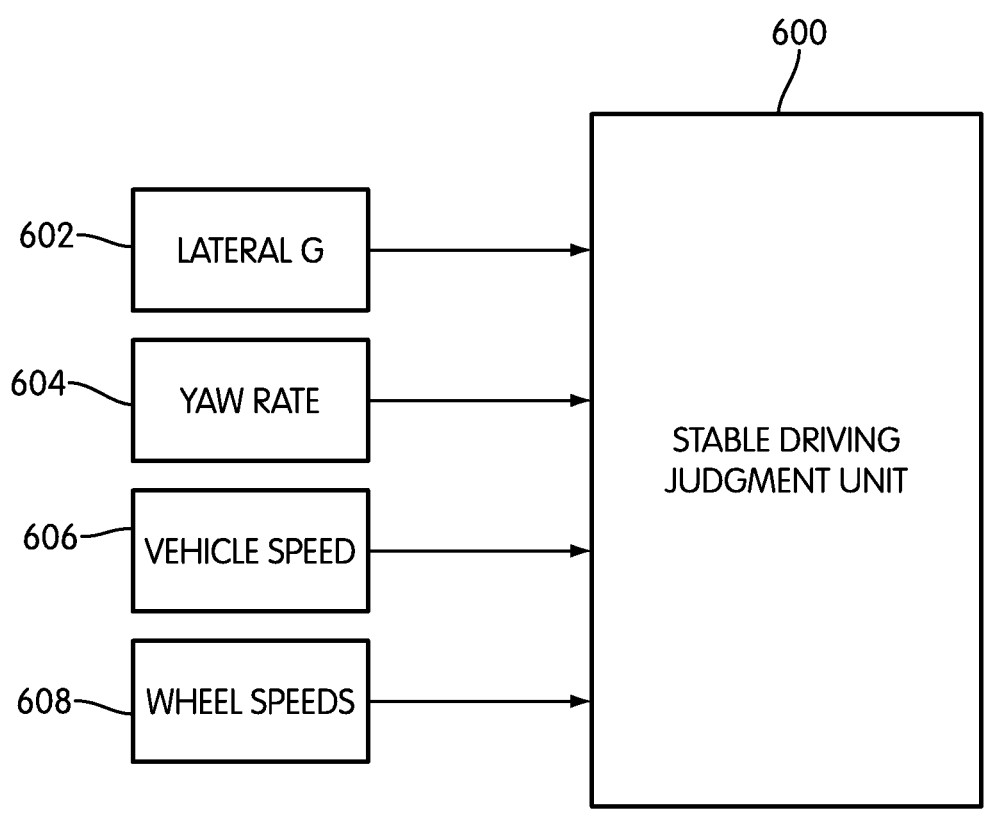
FIG. 6 is a schematic view of an embodiment of a stable driving judgment unit.

FIG. 6 illustrates an embodiment of stable driving judgment unit 600, including a set of inputs that are used to determine the stability mode of the motor vehicle. In some embodiments, stable driving judgment unit 600 includes first input 602, second input 604, third input 606 and fourth input 608. In some cases, first input 602 may be related to lateral G information about the motor vehicle. Likewise, second input 604 may be related to yaw rate information of the motor vehicle. In some embodiments, both lateral G information and yaw rate information can be received from an acceleration sensor as discussed above.

In addition, in some cases, third input 606 may be related to vehicle speed. In some cases, the vehicle speed can be determined from vehicle pulse information that may be received from a transmission of the motor vehicle. Also, fourth input 608 may be related to wheel speed information collected from each wheel of the motor vehicle. Using this information, differential wheel speed information can be determined.

In different embodiments, stable driving judgment unit 600 can use different methods for determining the stability mode of a motor vehicle. In some cases, stable driving judgment unit 600 can use of a variety of threshold values to determine if the motor vehicle is operating in a stable driving mode or an unstable driving mode. For example, in some cases, stable driving judgment unit 600 can determine that a motor vehicle is operating in a stable driving mode when the differential wheel speed is below a predetermined differential wheel speed. In other cases, stable driving judgment unit 600 can determine that the motor vehicle is operating in a stable driving mode when the yaw rate is below a predetermined yaw rate. In other cases, stable driving judgment unit 600 can determine that the motor vehicle is operating in a stable driving mode when the lateral acceleration is below a predetermined acceleration. In still other cases, stable driving judgment unit 600 can determine that the motor vehicle is operating in a stable driving mode when the vehicle speed is below a predetermined vehicle speed. In an exemplary embodiment, stable driving judgment unit 600 can determine that the motor vehicle is operating in a stable driving mode when all of these criteria are met simultaneously, in other words when the differential wheel speed, the yaw rate, the lateral acceleration, and the vehicle speed are all below their respective thresholds. By limiting the steering angle offset learning process to operating whenever the vehicle is in a stable driving mode, the vehicle stability assist system may help prevent errors in learning that may occur due to unstable operating conditions.

Generally, a stable driving judgment unit could use any information related to operating parameters of a motor vehicle. Although the current embodiment illustrates a stable driving judgment unit including four distinct inputs corresponding to lateral G information, yaw rate information, vehicle speed information and wheel speed information, in other embodiments any other number of inputs could be used. In some embodiments, less than four inputs could be used. In other embodiments, more than four inputs could be used.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of operating a motor vehicle that has a power steering electronic control unit, comprising:
   the power steering electronic control unit setting a relative steering angle equal to an initial value while a steering shaft is in a first angular position immediately following a first ignition on event;
   the power steering electronic control unit determining an amount of steering angle rotation of the steering shaft;
   the power steering electronic control unit determining a new value for the relative steering angle according to the amount of steering angle rotation;
   the power steering electronic control unit resetting the relative steering angle to the initial value while the steering shaft is in a second angular position immediately following a second ignition on event, the second ignition on event occurring later than the first ignition event; and
   wherein the first angular position is different than the second angular position.

2. The method according to claim 1, wherein the initial value is zero.

3. The method according to claim 1, wherein the step of determining the amount of rotation of the steering shaft includes a step of detecting an amount of motor rotation of a motor that facilitates turning the motor vehicle.

4. The method according to step 3, wherein the step of determining the amount of steering angle rotation includes a step of multiplying the degrees of motor angle rotation by a fixed ratio.

5. The method according to claim 1, wherein the step of determining the new value for the relative steering angle includes a step of adding the amount of steering angle rotation to a current value of the relative steering angle.

6. The method according to claim 1, wherein the step of resetting the relative steering angle to the initial value includes a step of erasing any stored values for the relative steering angle.

7. The method according to claim 1, further comprising the power steering electronic control unit determining that the motor vehicle is operating in a stable driving mode prior to determining the new value for the relative steering angle rotation.

8. A method of operating a motor vehicle that has a power steering electronic control unit, comprising:
- the power steering electronic control unit determining a relative steering angle, the relative steering angle differing from an actual steering angle by a steering angle offset and wherein the value of the steering angle offset varies according to an initial angular position of a steering shaft at the time of a first ignition on event;
- the power steering electronic control unit determining if the motor vehicle is operating in a stable driving mode or an unstable driving mode;
- the power steering electronic control unit performing a step of determining the steering angle offset when the motor vehicle is operating in the stable driving mode; and
- the power steering electronic control unit calculating an adjusted steering angle using the relative steering angle and the steering angle offset.

9. The method according to claim 8, wherein the steps of determining the steering angle offset and calculating the adjusted steering angle include a step of iteratively changing the steering angle offset until the adjusted steering angle is approximately equal to the actual steering angle.

10. The method according to claim 8, wherein the step of determining the steering angle offset is performed by a vehicle stability assist system.

11. The method according to claim 8, wherein the step of determining the relative steering angle is performed by a power steering system.

12. The method according to claim 8, wherein the step of determining if the motor vehicle is operating in a stable driving mode includes a step of receiving information from at least two wheel speed sensors.

13. The method according to claim 8, wherein the step of determining if the motor vehicle is operating in a stable driving mode includes a step of receiving information from an acceleration sensor and wherein the acceleration sensor is capable of detecting lateral accelerations of the motor vehicle and a yaw rate of the motor vehicle.

14. The method according to claim 8, wherein the step of determining if the motor vehicle is operating in a stable driving mode includes a step of receiving information related to vehicle speed.

15. The method according to claim 8, further comprising the power steering electronic control unit resetting the relative steering angle immediately following a second ignition on event occurring later than the first ignition on event.

16. A method of operating a motor vehicle that has a power steering electronic control unit, comprising:
- the power steering electronic control unit setting a relative steering angle equal to an initial value while a steering shaft is in a first angular position immediately following a first ignition on event;
- the power steering electronic control unit determining an amount of steering angle rotation of the steering shaft;
- the power steering electronic control unit determining a new value for the relative steering angle according to the amount of steering angle rotation; and
- the power steering electronic control unit resetting the relative steering angle to the initial value while the steering shaft is in a second angular position immediately following a second ignition on event, the second ignition on event occurring later than the first ignition event;
- wherein the first angular position is different from the second angular position; and
- wherein the relative steering angle differs from an actual steering angle by a steering angle offset and wherein the value of the steering angle offset varies according to the first angular position of the steering shaft immediately following the first ignition on event.

17. The method according to claim 16, wherein the step of determining the new value for the relative steering angle includes a step of adding the amount of steering angle rotation to a current value of the relative steering angle.

18. The method according to claim 16, wherein the step of resetting the relative steering angle to the initial value includes a step of erasing any stored values for the relative steering angle.

19. The method according to claim 16, further comprising the power steering electronic control unit determining that the motor vehicle is operating in a stable driving mode prior to determining the new value for the relative steering angle.

20. The method according to claim 16, wherein the relative steering angle has a resolution that is not greater than 1 degree.

* * * * *